United States Patent [19]

Metz

[11] 4,382,162
[45] May 3, 1983

[54] CALCULATOR PUSHBUTTON FORMAT ATTACHMENT FOR PUSHBUTTON TELEPHONES

[76] Inventor: Hugh J. Metz, 4328 Deerfield Rd., Knoxville, Tenn. 37921

[21] Appl. No.: 266,742

[22] Filed: May 26, 1981

[51] Int. Cl.³ .................. H04M 1/23; H01H 3/20
[52] U.S. Cl. .................. 179/90 A; 179/90 K; 200/331; 200/332
[58] Field of Search ............... 179/2 DP, 90 A, 90 K; 200/331, 332

[56] References Cited

U.S. PATENT DOCUMENTS

| | | | |
|---|---|---|---|
| 3,557,311 | 1/1971 | Goldstein | 179/2 DP |
| 3,627,936 | 12/1971 | Cullen | 340/365 R |
| 3,778,553 | 12/1973 | Rackman | 179/2 DP |
| 3,995,123 | 11/1976 | Wilson | 179/90 K |
| 4,002,855 | 1/1977 | Schiffman | 179/90 K |
| 4,063,046 | 12/1977 | Schiffman et al. | 179/2 DP X |
| 4,296,291 | 10/1981 | Johnson | 200/332 X |

FOREIGN PATENT DOCUMENTS 43-29164  9/1965  Japan .................. 179/90 K

OTHER PUBLICATIONS

*Radio & Electronics* (USA), vol. 48, No. 6, Jun. 1977; pp. 38–41 & 80–82, "Pushbutton Dialer with Memory" by Dick Feinwell.

Primary Examiner—G. Z. Rubinson
Assistant Examiner—Keith E. George
Attorney, Agent, or Firm—James M. Spicer

[57] ABSTRACT

A telephone attachment is provided for fitting over the keyboard of a pushbutton telephone for converting from the telephone pushbutton format to a calculator pushbutton format. The attachment design includes a plurality of u-shaped levers in contact with several attachment-mounted pushbuttons arranged in a calculator format. The individual levers are so disposed within the attachment that they depress correspondingly-numbered telephone pushbuttons when the calculator format pushbuttons are depressed. Through the use of the attachment, a telephone user operates a pushbutton telephone using the calculator pushbutton format.

4 Claims, 4 Drawing Figures

CALCULATOR PUSHBUTTON FORMAT ATTACHMENT FOR PUSHBUTTON TELEPHONES

BACKGROUND OF THE INVENTION

The invention relates to telephone attachments and more particularly to an attachment fitted over the keyboard of a pushbutton telephone for converting from the telephone pushbutton format to a calculator pushbutton format without affecting telephone operation.

The calculator pushbutton format is widely used in the manually operated keyboards of adding machines and hand-held electronic calculators. Many users of such keyboard machines become accustomed to the calculator pushbutton format through continued usage. Because the telephone keyboard is arranged in a different format than the calculator keyboard, such persons often experience mistakes in telephone dialing due to their more habitual use of the calculator format. For these telephone users it would be desirable to make available a calculator pushbutton format on the standard pushbutton telephone.

PRIOR ART

In the prior art, U.S. Pat. No. 3,627,936 describes an electrical apparatus for converting from the telephone pushbutton format to a calculator pushbutton format on a pushbutton telephone. However, that device is not widely available to telephone users. Rather, it appears intended for installation during telephone manufacture and not for later addition to existing telephones as, for example, by a telephone user.

Accordingly, there exists a need to provide a user-installable means of converting from the telephone pushbutton format to a calculator pushbutton format on a pushbutton telephone. The present invention meets this need in a manner to be described hereinbelow.

SUMMARY OF THE INVENTION

It is the object of the present invention to provide a telephone attachment which will allow a telephone user to operate a pushbutton telephone using a calculator pushbutton format. The above object has been accomplished in the present invention by providing an attachment for placement over the keyboard of a standard pushbutton telephone. A housing containing several u-shaped levers and a plurality of pushbuttons arranged in a calculator pushbutton format is attached to the telephone case over the telephone pushbuttons. The levers are so disposed that they depress the telephone pushbuttons when a telephone user depresses the corresponding calculator array pushbuttons in telephone operation.

DETAILED DESCRIPTION

Figure 1:
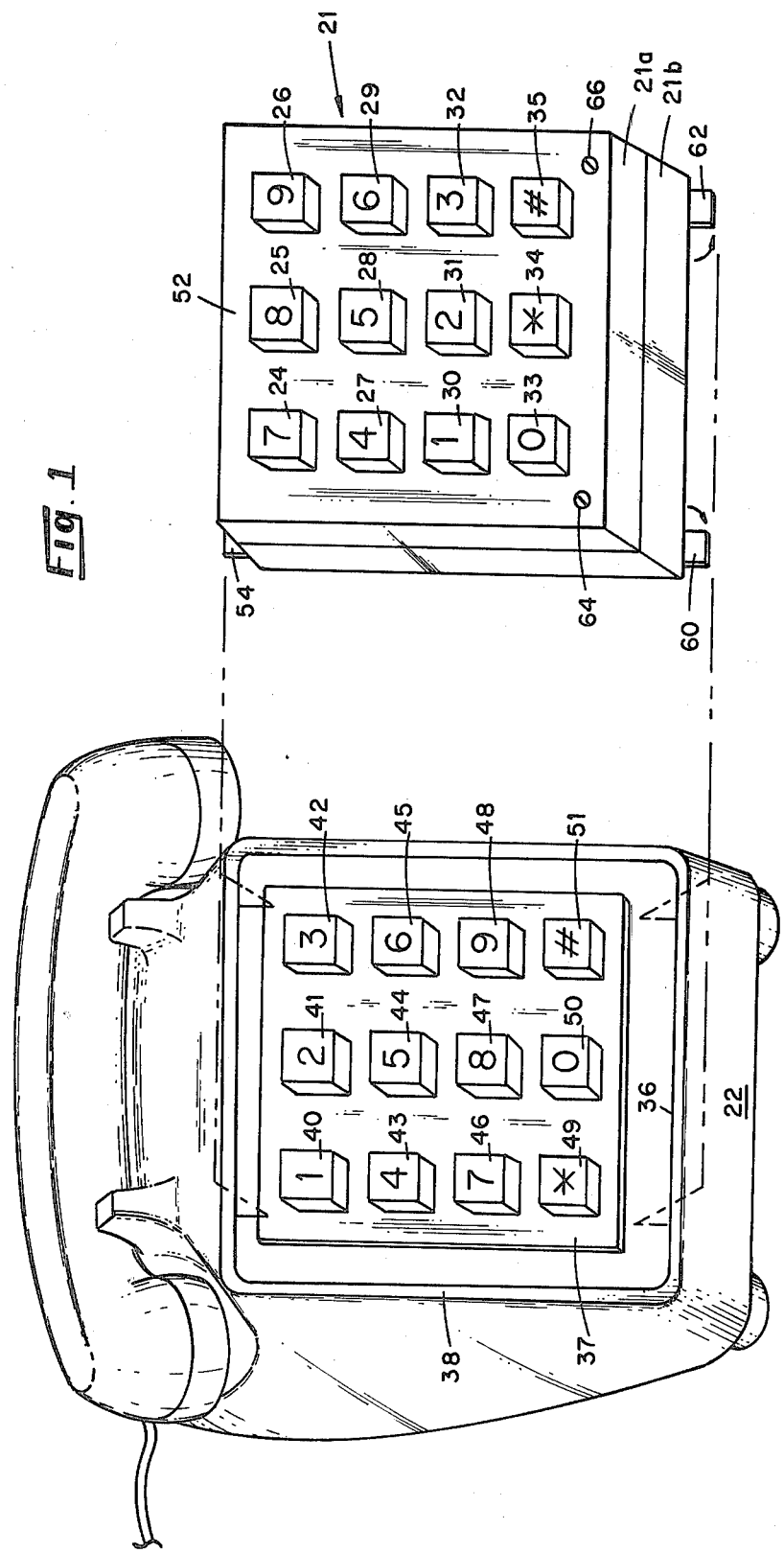
FIG. 1 is a perspective view of a telephone attachment of the present invention.

Referring now to the drawings, initially to FIG. 1, an attachment made in accordance with the invention is shown above a standard desk-type pushbutton telephone. The attachment consists of a housing 21 that is mounted to the face of the telephone over the conventional telephone pushbuttons. In more detail, the housing 21 comprises two rectangularly shaped assembly portions 21a, 21b that are joined together in manufacture.

The housing 21 is provided with at least twelve pushbuttons 24-35 arranged in a calculator pushbutton format in accordance with this invention. The pushbuttons 24-35 are mounted in the housing portion 21a in a manner to be described later, and protrude through the top surface 52 of housing portion 21a for telephone operation by a telephone user.

As further illustrated in FIG. 1, the face-plate of a standard desk-type pushbutton telephone 22 has been removed to expose the opening in the telephone case defined by the rim 36 in the telephone face 38. All of the telephone pushbuttons 40-51 are visible in the center of the opening in their assembly structure 37. The assembly portion 21b of the housing 21 has two fixed tabs 54 and 56, only one of which (54) is visible in FIG. 1. These tabs fit beneath the upper portion of the rim 36 in the telephone case opening as indicated by the dashed lines at the top of FIG. 1. With the housing 21 fitted in place over the rim 36, two movable tabs 60, 62 projecting from housing portion 21b are rotated by screw means 64 and 66, respectively, into locking positions beneath the lower portion of the rim 36 in the telephone case opening as indicated by the lower dashed lines. By this preferred means, the attachment is firmly mounted to the telephone with the telephone pushbuttons 40-51 protruding into the interior of assembly portion 21b.

The twelve pushbuttons 24-35 that protrude through the top surface 52 of assembly portion 21a are in a calculator pushbutton format as is frequently encountered in office machines and hand-held calculators. A comparison of this pushbutton format with the telephone pushbutton format, also shown in FIG. 1, shows that the first and third rows of pushbuttons are transposed in the two formats, i.e., the pushbuttons bearing the numerals 1, 2, 3 are transposed with the pushbuttons bearing the numerals 7, 8, 9 in the two formats. Also transposed in the two formats are the pushbuttons bearing the numeral 0 and the asterisk (*) symbol in the fourth row. It will also be noted that the relative positions of all the pushbuttons in the second row (those bearing the numerals 4, 5, 6), and the octothorpe (#) symbol in the fourth row are unchanged in the two formats.

Figure 2:
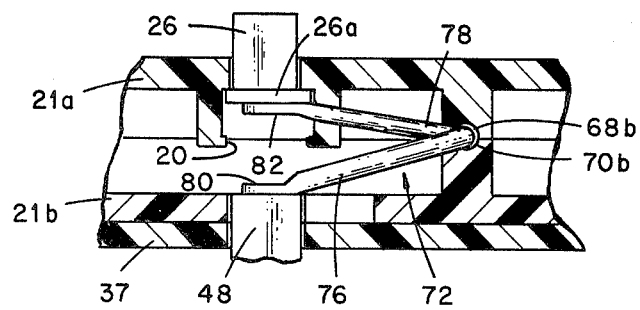
FIG. 2 is a partial cross-sectional view of the telephone attachment illustrating the functional cooperation of one calculator format pushbutton with its corresponding telephone pushbutton.

With reference now to FIG. 2, each attachment pushbutton is mounted in the attachment in the manner illustrated by pushbutton 26. Pushbutton 26 has an enlarged portion 26a, and is slidably movable in a recess formed in assembly portion 21a. The pushbutton 26 is held in place in the recess by means of a lip portion 20 in the assembly portion 21a.

Figure 3:
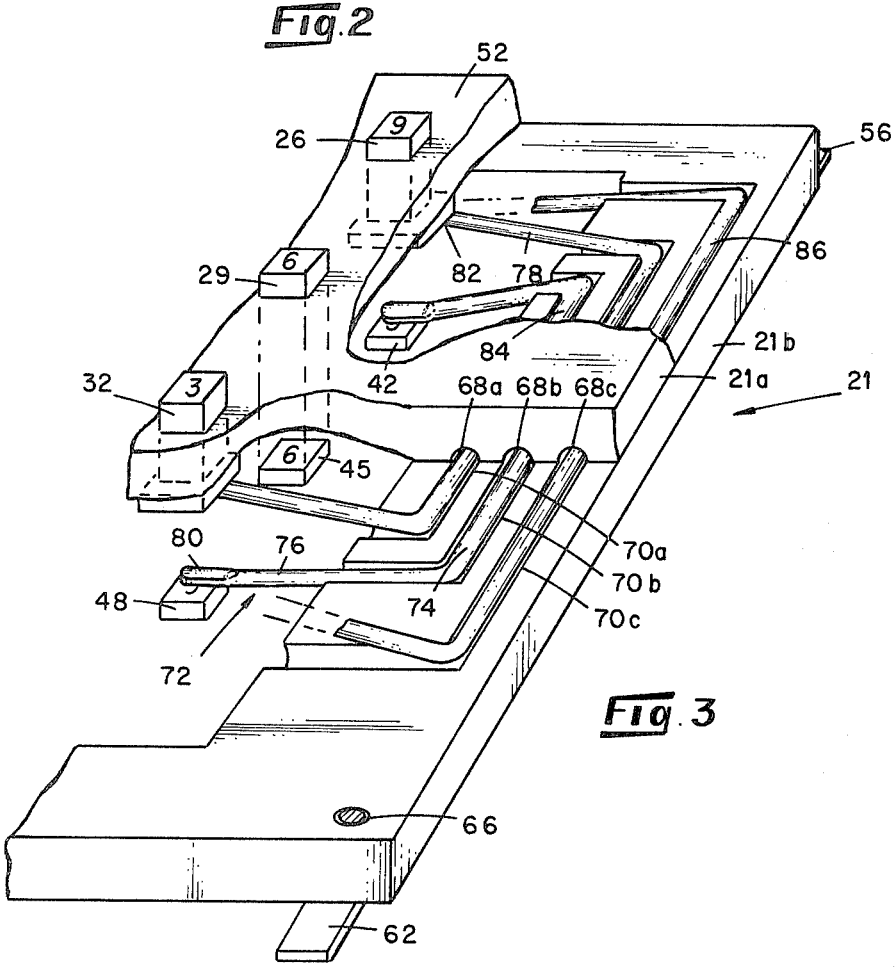
FIG. 3 is a partial perspective view of the telephone attachment illustrating the functional cooperation of three representative calculator and telephone pushbutton format pushbuttons.

In FIG. 3, the assembly portion 21a has several elongated concave depressions 68a, 68b, 68c, etc. in the surface which mates with assembly portion 21b. The mating surface of assembly portion 21b likewise has several elongated concave depressions 70a, 70b, 70c, etc., in corresponding locations. Each corresponding pair of concave depressions in the two assembly portions, for example 68b and 70b in FIGS. 2 and 3, define cylindrical passageways, or fulcrums, whose purpose is to mount the central shaft-like portions of several u-shaped levers.

Taking the u-shaped lever generally designated at 72 as an example, the concave depressions 68b, 70b define a cylindrical fulcrum when the assembly portions 21a, 21b are joined that mounts the central shaft-like portion 74 of lever 72 for rotation therewithin. In total, six or eight of the concave depressions are provided in each of the assembly portions 21a, 21b to provide six or eight fulcrums for rotatably mounting a like number of levers within the housing as will be described in more detail later.

In addition to its central shaft-like portion 74, the u-shaped lever 72 further comprises two nearly planar straight arm portions 76, 78 at right angles to the central portion 74 that terminate in flattened ends 80, 82, respectively. In the case of lever 72, the straight arm portion 76 is normally in contacting arrangement at its end 80 with the top of the telephone pushbutton 48. Although it is not clearly visible in FIG. 3, telephone pushbutton 48 bears the numeral 9. The other straight arm portion 78 of lever 72 normally is in contacting engagement at its end 82 with bottom of the correspondingly numbered (i.e., bearing the numeral 9) attachment mounted pushbutton 26.

It will be understood with the aid of FIGS. 2 and 3 that as attachment pushbutton 26 is depressed by a telephone user for dialing purposes, a downward-directed force is thereby produced on lever end 82. This force is transmitted by arm portion 78 to the central shaft-like portion 74, rotating it in its cylindrical fulcrum. This rotation transmits the downward-directed force to telephone pushbutton 48 through the arm portion 76 and lever end 80, thereby effecting the actuation of pushbutton 48 for telephone dialing purposes.

Also in FIG. 3, the telephone pushbutton 45 that bears the numeral 6 is located directly beneath the attachment-mounted pushbutton 29 which also bears the numeral 6 (compare the two pushbutton formats in FIG. 1). For pushbutton 29 and the other pushbuttons whose locations are not changed in the two formats, the attachment pushbutton comprises an elongated pushbutton that fits snugly over the corresponding telephone pushbutton directly beneath. Thus, in FIG. 3, depression of pushbutton 29 directly depresses telephone pushbutton 45 in telephone operation.

Figure 4:
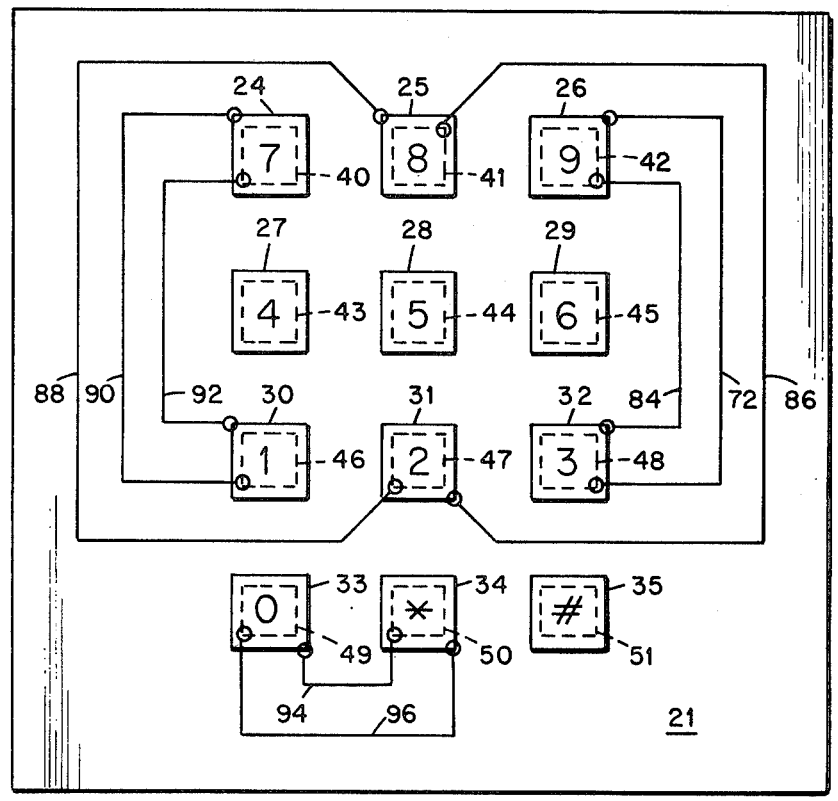
FIG. 4 illlustrates the lever locations in the telephone attachment.

The connective arrangement of all the u-shaped levers according to this invention is illustrated schematically in FIG. 4. The numbered squares in FIG. 4 represent the calculator format pushbuttons. The telephone pushbuttons located directly beneath the calculator format pushbuttons are indicated by the smaller dotted squares depicted within the numbered squares. The u-shaped lever 72 is illustrated in FIG. 4 as operatively engaging attachment-mounted pushbutton 26 and telephone pushbutton 48 as previously described.

In like manner, the other u-shaped levers of this invention are illustrated in their respective locations within the housing 21, along with the attachment pushbuttons and telephone pushbuttons they are in contacting (operative) engagement with, namely: lever 84 engages telephone pushbutton 42 and attachment pushbutton 32, both pushbuttons bearing the numeral 3; lever 86 engages telephone pushbutton 41 and attachment pushbutton 31, both pushbuttons bearing the numeral 2; lever 88 engages telephone pushbutton 47 and attachment pushbutton 25, both pushbuttons bearing the numeral 8; lever 90 engages telephone pushbutton 46 and attachment pushbutton 24, both pushbuttons bearing the numeral 7; lever 92 engages telephone pushbutton 40 and attachment pushbutton 30, both pushbuttons bearing the numeral 1.

The attachment pushbuttons 27, 28, and 35 are elongated pushbuttons in the manner of pushbutton 29 that each fit snugly over telephone pushbuttons 43, 44, and 51, respectively, located directly beneath; and which bear corresponding numerals or symbols as previously described.

Also shown in FIG. 4 are the representative locations of two smaller u-shaped levers 94, 96 that are used to transpose the zero (0) and the asterisk (*) pushbuttons in the two formats. Lever 94 engages telephone pushbutton 50 and attachment pushbutton 33 both pushbuttons bearing the numeral zero (0). Similarly, lever 96 engages telephone pushbutton 49 and attachment pushbutton 34, both pushbuttons bearing the asterisk (*) symbol.

Most calculator pushbutton formats in use today utilize the numeral (0) in the lower lefthand corner of the array as indicated in FIG. 4. The conversion of the telephone format to this calculator format would require the use of eight u-shaped levers, namely, the levers 72, 84, 86, 88, 90, 92, 94, and 96 in FIG. 4. Some few calculator formats in use, however, have the numeral zero (0) in the lower center location in the array, that is, in the same location that it occurs in the telephone format (see FIG. 1). For this latter calculator format then, the levers 94, 96 would not be required. The six levers 72, 84, 86, 88, 90, and 92 in FIG. 4 are all that would be required for converting from the telephone pushbutton format to a calculator pushbutton format.

In the preferred embodiment of the invention, the housing portions and attachment pushbuttons are fabricated from a rigid plastic and the u-shaped levers are fabricated from stainless steel. The above description of the invention should not be interpreted in a limiting sense. It is intended, rather, that the invention be limited only by the scope of the appended claims.

What is claimed is:

1. An attachment for mounting over the keyboard of a pushbutton telephone for converting from the telephone pushbutton format to a standard calculator pushbutton format comprising:
   a. a housing constructed for mounting on a pushbutton type telephone over the identified telephone pushbuttons arranged and identified in telephone format;
   b. at least twelve pushbuttons arranged and identified in a calculator format mounted in said housing, with a first end projecting above said housing for operation by a telephone user, and a further end within said housing; and
   c. u-shaped levers corresponding only to the number of identified pushbuttons in said housing that are not in format registry with corresponding identified pushbuttons of said telephone, said levers being rotatable within said housing and each lever having a first arm with a distal end in contact with a correspondingly identified one of said telephone pushbuttons and a further arm with a distal end in registry with a correspondingly identified one of said at least twelve pushbuttons, said distal end of said further arm being more elevated from said telephone pushbuttons than said distal end of said first arm.

2. The attachment of claim 1 wherein said first arm and said further arm of each of said u-shaped levers are not in a common plane.

3. The attachment of claim 2 wherein each of said u-shaped levers comprises a central shaft-like portion and two straight arm portions at right angles to said central shaft-like portion, each arm terminating in a flattened distal end for contact with said further end of one of said pushbuttons in said housing and with a corresponding telephone pushbutton.

4. The attachment of claim 3 wherein said housing comprises two rectangularly-shaped assembly portions whose mating surfaces have corresponding elongated concave depressions that, in combination define cylindrical fulcrums for rotatably mounting each of said central shaft-like portions of said u-shaped levers when said assembly portions are joined together.

* * * * *